United States Patent
Brehm et al.

(10) Patent No.: US 12,505,536 B2
(45) Date of Patent: Dec. 23, 2025

(54) METHOD AND APPARATUS FOR PROVIDING A PERFUSION IMAGE DATA SET OF A PATIENT

(71) Applicant: Siemens Healthineers AG, Forchheim (DE)

(72) Inventors: Marcus Brehm, Forchheim (DE); Bernhard Schmidt, Fuerth (DE); Thomas Flohr, Uehlfeld (DE)

(73) Assignee: Siemens Healthineers AG, Forchheim (DE)

(*) Notice: Subject to any disclaimer, the term of this patent is extended or adjusted under 35 U.S.C. 154(b) by 383 days.

(21) Appl. No.: 18/059,126

(22) Filed: Nov. 28, 2022

(65) Prior Publication Data
US 2023/0169654 A1   Jun. 1, 2023

(30) Foreign Application Priority Data
Nov. 30, 2021 (DE) .................. 10 2021 213 557.9

(51) Int. Cl.
| | |
|---|---|
| *G06K 9/00* | (2022.01) |
| *A61B 6/00* | (2006.01) |
| *A61K 35/12* | (2015.01) |
| *G06T 7/00* | (2017.01) |

(52) U.S. Cl.
CPC ............ *G06T 7/0012* (2013.01); *A61B 6/481* (2013.01); *G06T 2207/10116* (2013.01); *G06T 2207/30061* (2013.01)

(58) Field of Classification Search
CPC .... G06K 9/00; G06T 7/00; A61B 6/50; A61K 35/12
USPC ........ 382/100, 103, 106–107, 128–133, 154, 382/157, 162, 168, 173, 181, 199, 274, 382/286–291, 305, 312; 378/4, 21, 23, 378/28
See application file for complete search history.

(56) References Cited

U.S. PATENT DOCUMENTS

| | | |
|---|---|---|
| 2006/0241402 A1 | 10/2006 | Johns |
| 2007/0217570 A1 | 9/2007 | Grasruck et al. |
| 2010/0135453 A1 | 6/2010 | Mendonca et al. |

(Continued)

FOREIGN PATENT DOCUMENTS

| | | |
|---|---|---|
| DE | 102015204450 A1 | 9/2016 |
| DE | 102019218589 A1 | 6/2021 |

(Continued)

OTHER PUBLICATIONS

Cardiac MR perfusion image processing techniques: A survey Vikas Gupta a,b, Hortense A. Kirisli a,c, Emile A. Hendriks b (2012) (Year: 2012).*

(Continued)

*Primary Examiner* — Seyed H Azarian
(74) *Attorney, Agent, or Firm* — Harness, Dickey & Pierce, P.L.C.

(57) ABSTRACT

A first image data set and at least one second image data set are captured, and a contrast-enhanced image data set and a non-contrast image data set are determined based on the first and the at least one second image data set. The perfusion image data set is calculated based on a ratio of image values of the contrast-enhanced image data set and locally corresponding image values of the non-contrast image data set, and the perfusion image data set is provided via a second interface.

20 Claims, 3 Drawing Sheets

(56) References Cited

U.S. PATENT DOCUMENTS

| | | | |
|---|---|---|---|
| 2016/0262713 A1* | 9/2016 | Flohr | A61B 6/5205 |
| 2016/0302751 A1* | 10/2016 | Grant | A61B 6/50 |
| 2018/0165812 A1* | 6/2018 | Flohr | G06T 11/005 |
| 2018/0256124 A1 | 9/2018 | Jang et al. | |
| 2019/0150864 A1* | 5/2019 | Flohr | G06T 5/70 |
| 2021/0335483 A1* | 10/2021 | Freeman | G16H 50/20 |
| 2022/0401588 A1 | 12/2022 | Bayer | |

FOREIGN PATENT DOCUMENTS

| | | |
|---|---|---|
| JP | 2006247388 A | 9/2006 |
| WO | WO 2009040742 A2 | 4/2009 |

OTHER PUBLICATIONS

Grob D. et al.:"Imaging of pulmonary perfusion using subtraction CT angiography is feasible in clinical practice" Eur Radiol. Mar. 2019;29(3):1408-1414. doi: 10.1007/s00330-018-5740-4.

Renard B. et al.:"Dual-energy CT angiography of chronic thromboembolic disease: can it help recognize links between the severity of pulmonary arterial obstruction and perfusion defects?" Eur J Radiol 2011; 79 (3): 467-72.

Kalender W. et al.:"Materialselektive Bildgebung und Dichtemessung mit der Zwei-Spektren-Methode", I. Grundlagen und Methodik, Bilddiagn. 7, 1987, Seiten 66-77, Georg Thieme Verlag.

Kreitner KF et al.:"Chronic thromboembolic pulmonary hypertension—assessment by magnetic resonance imag-ing." Eur Radiol 2007; 17 (1): 11-21.

Konstantinides SV. et al:"2014 ESC guide-lines on the diagnosis and management of acute pulmonary embolism", Eur Heart J 2014; 35 (43): 3033-69, 69a-69k.

Uhrig M. et al.:"Monitoring targeted therapy using dual-energy CT: semi-automatic RECIST plus supplementary functional information by quantifying iodine uptake of melanoma metastases", Cancer Imaging. Jul. 22, 2013;13(3):306-13. doi: 10.1102/1470-7330.2013.0031. PMID: 23876444; PMCID: PMC3719051).

Petersilka M. et al: "Technical principles of dual source CT (in European Journal of Radiology", vol. 68, Issue 3, 2008, pp. 362-368, https://doi.org/10.1016/j.ejrad.2008.08.013).

* cited by examiner

FIG 1
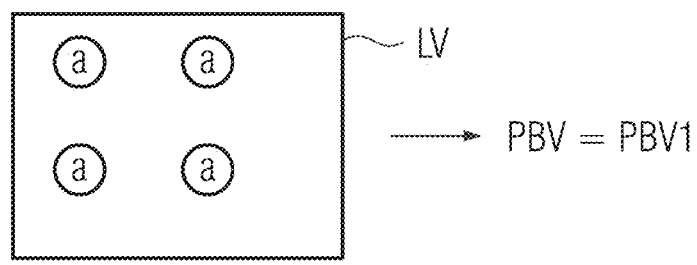
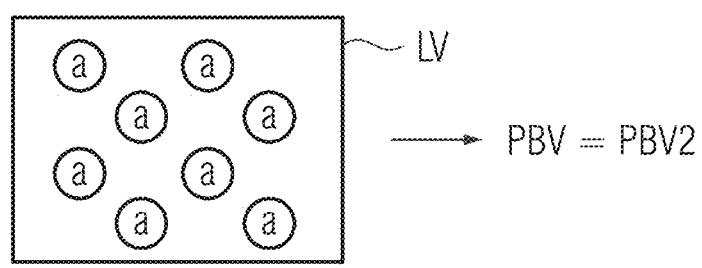
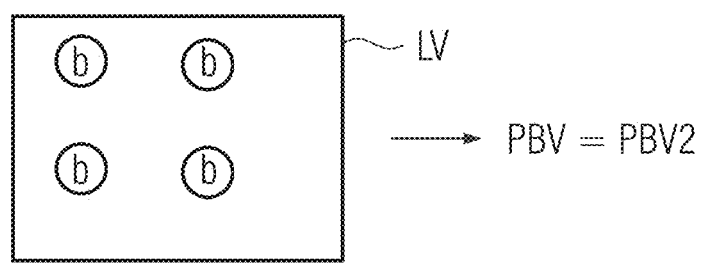
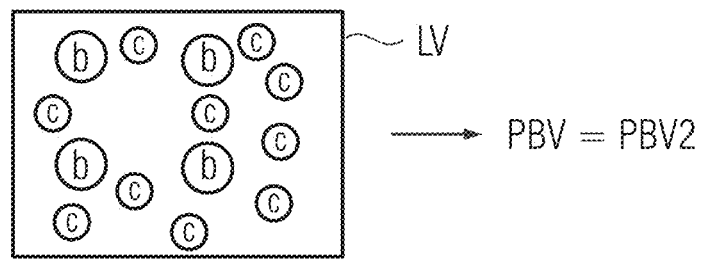

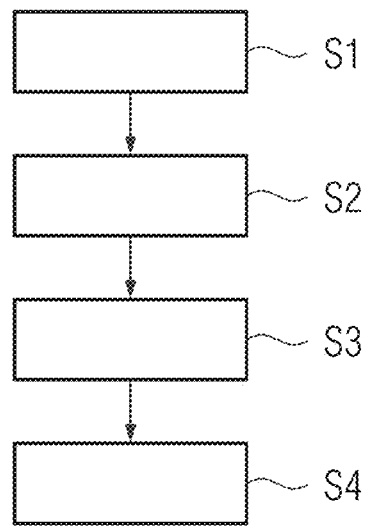
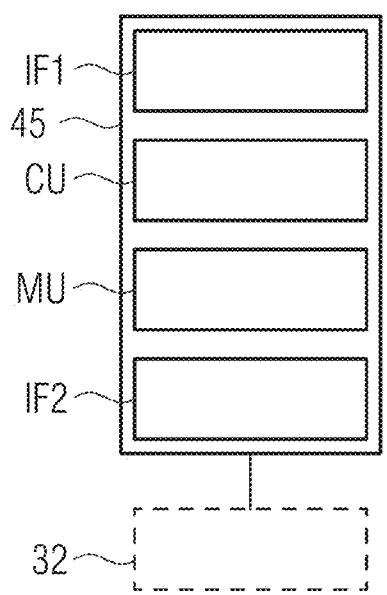

METHOD AND APPARATUS FOR PROVIDING A PERFUSION IMAGE DATA SET OF A PATIENT

CROSS-REFERENCE TO RELATED APPLICATION(S)

The present application claims priority under 35 U.S.C. § 119 to German Patent Application No. 10 2021 213 557.9, filed Nov. 30, 2021, the entire contents of which are incorporated herein by reference.

FIELD

One or more example embodiments of the present invention relate to a method and an associated apparatus for providing a perfusion image data set of a patient based on a captured first image data set and a captured second image data set of the patient. Furthermore, one or more example embodiments of the present invention relate to a medical imaging device, a computer program product and a computer-readable storage medium.

BACKGROUND

Modern imaging methods are frequently used to generate two- or three-dimensional image data that can be used to visualize a mapped examination object and moreover also for further applications. Imaging methods are frequently based on the capture of X-rays, wherein so-called projection measurement data is generated. For example, projection measurement data can be acquired with the aid of a computed tomography device (CT device). In CT systems, a combination of an X-ray source and an opposite X-ray detector mounted on a gantry usually rotates about a scanning area in which the examination object (hereinafter referred to as the patient without limitation of generality) is located. Herein, the center of rotation (also called the "isocenter") coincides with a so-called system axis, also called the z-axis, that extends in the z-direction. During one or more rotations, the patient is irradiated with X-rays from the X-ray source, wherein image data sets in the form of projection measurement data or X-ray projection data are captured with the aid of the opposite X-ray detector. Based on projection measurement data, image data sets for a spatial representation of the patient in the image space can be generated via a suitable reconstruction algorithm. A reconstruction or reconstruction algorithm is any image reconstruction algorithm known in the field, for example weighted filtered back projection (WFBP), such as is frequently used in computed tomography. Alternative reconstruction algorithms are equally possible and their application is within the skill of the art.

In spectral computed tomography and likewise in other radiographic methods, the use of different tube voltages or the use of an energy-resolving detector enables, for example, the reconstruction of a plurality of images of the same object volume which differ in the X-ray attenuation caused by the material present due to the different X-ray spectra recorded by the detector, i.e., X-ray quantum energy distribution. Based on this, it is then, for example, possible to identify at least two materials via material decomposition. In addition to vascular-morphological information, this can also be used to obtain functional information. One example of this is perfusion imaging with the aid of which the blood flow to, for example, a specific tissue area is to be measured. Herein, the patient is injected with a contrast medium, usually iodine. Material decomposition can then be used to extract partial information, such as the distribution of the contrast medium in the patient. A map of this kind provides information on local iodine concentrations (iodine per volume, for example mg/ml or mg/cm3) in the tissue from which conclusions regarding the blood flow can be drawn.

One example of the application of perfusion imaging is to map the perfusion of the lung parenchyma. With each inhalation and exhalation, fresh air is brought to the blood-air barrier of the lung and thus to the pulmonary sacs or alveoli. Gas exchange, and thus oxygenation of the blood and release of CO2, then takes place at the level of the alveoli. Herein, there are two decisive factors: adequate ventilation (supply of fresh air) and adequate perfusion (blood supply to the organ). A disturbance in the perfusion of the lung parenchyma can have potentially life-threatening consequences. For example, a pulmonary embolism can lead to a perfusion defect of the lung parenchyma, triggered by the occlusion of an afferent blood vessel in the lung.

Diagnostically, in the case of a high-risk constellation, when computed tomography (CT) is available, contrast-enhanced CT angiography (CTA) is frequently used to detect thromboembolism. However, CTA only provides a morphological representation that can indicate the position of the thrombus (contrast enhancement ends abruptly in a vessel), but not a functional representation, for example in the form of a perfusion map. As a result, due to the resolution, small emboli are not necessarily detected in a CTA, which can nevertheless entail larger perfusion defects.

As mentioned above, in addition to vascular-morphological information, spectral computed tomography can also be used to obtain functional information, and thus also direct information on a perfusion defect. A contrast map resulting from material decomposition provides information on local contrast medium concentrations (for example, iodine per volume, for example mg/ml or mg/cm3) in the lung tissue and enables conclusions to be drawn regarding the relationships of perfused blood volume in the lung parenchyma, therefore also called lung perfused blood volume (lung PBV). Compared to a CTA, this not only provides a representation of potential causes of a perfusion defect it also provides a representation of the actual perfusion defect. A similar map can alternatively also be achieved by an additional CT scan before administration of the contrast medium and a CT scan during/after administration of the contrast medium and subtraction of the two CT scans from one another.

SUMMARY

Conventional mapping via an above-described contrast map representing the local contrast medium concentration neglects morphological properties of the tissue under consideration, which, however, can vary in the context of different physical and physiological influences and cannot always provide information as to whether a higher concentration of contrast medium as shown is actually attributable to higher or lower perfusion of a tissue or to a changed morphology of the tissue relative to the normal state. This is in particular difficult in cases in which the morphology of a tissue can change over time even under normal conditions, such as, for example, in the case of lung parenchyma solely due to inhalation or exhalation.

It is an object of one or more example embodiments of the present invention to provide a perfusion image data set that is improved in this respect.

The object is achieved by the method and the apparatuses according to one or more example embodiments of the present invention and/or described in the independent claims. Advantageous embodiments that are individually inventive are the subject matter of the subclaims and/or the following description.

One or more example embodiments of the present invention relate to a method for providing a perfusion image data set of a patient comprising the steps of capturing, determining, calculating and providing.

The step of capturing comprises capturing a first image data set representing a first X-ray attenuation distribution of the patient corresponding to a first X-ray quantum energy distribution and at least one second image data set representing at least one second X-ray attenuation distribution of the patient corresponding to at least one second X-ray quantum energy distribution via a first interface, wherein the first and second image data set are recorded with contrast medium administration.

Alternatively, the step of capturing comprises capturing a first image data set of the patient, wherein the first image data set is recorded with contrast medium administration and represents a first X-ray attenuation distribution (also referred to as a third X-ray attenuation distribution) of the patient with contrast medium, and a second image data set of the patient, wherein the second image data set is recorded without contrast medium administration and represents a first X-ray attenuation distribution (also referred to as a fourth X-ray attenuation distribution) of the patient without contrast medium.

The image data sets can be generated with a medical imaging device, according to one or more example embodiments of the present invention, which is described in more detail below, and captured in the step of capturing via the first interface for the further method steps of the method according to one or more example embodiments of the present invention. It can, for example, also be stored on a computer-readable storage medium or held on a network or server and read via the first interface in the step of capturing and captured for the further method steps of the method according to one or more example embodiments of the present invention.

The first image data set and the second image data set can in particular be a tomographic image data set determined, i.e., reconstructed, based on a plurality of projection data sets recorded from different projection angles. These can be computed tomography-image data sets determined via a computed tomography device. However, the first and second image data set can also have been determined with other radiographic methods, for example via a C-arm X-ray device. The result of such radiographic methods, such as, for example, computed tomography, is the representation of the (X-ray) attenuation of an X-ray beam along its path from an X-ray source to an X-ray detector. This X-ray attenuation is caused by the media or materials irradiated along the beam path. The attenuation is usually defined as the logarithm of the ratio of the intensity of the attenuated radiation to the primary radiation and denoted, when referenced to a path normal, as the attenuation coefficient of the material. In some radiographic imaging applications, however, in particular in computed tomography applications, instead of the actual attenuation coefficient, the attenuation distribution of an X-ray beam in an object under examination is represented by a value normalized to the attenuation coefficient of water, the CT number in Hounsfield units (HU). This is calculated in a generally known manner from an attenuation coefficient currently determined in a generally known manner by measurement and the reference attenuation coefficient of water. The first or second image data set can in particular reproduce a spatial distribution of the attenuation coefficient or the CT number, i.e., the X-ray attenuation distribution of the patient.

The first and the at least one second image data set or, in the alternative embodiment, only the first image data set is in particular generated with contrast medium administration and thus corresponds to a contrast-enhanced image data set. A contrast-enhanced image data set is in particular based on the fact that, prior to the acquisition of the measurement data on which the image data set is based, a contrast medium has been administered to a patient, for example injected intravenously, in order to generate contrast enhancement in the acquired image data set. In the context of one or more example embodiments of the present invention, a contrast medium should be understood to mean any medium which, after administration to the examination object, leads to contrast improvement or contrast enhancement in terms of absorption, i.e., in the X-ray image. Preferably, a contrast medium with an atomic number greater than 20 or greater than 40 is used. In particular, the contrast medium has an atomic number lower than 83 or lower than 70. Particularly advantageous contrast media contain, for example, iodine. However, the contrast medium can also be based on gadolinium or another material, for example.

The patient can be a human patient and/or a veterinary patient. The image data sets determined can relate to a partial area of the patient's body, for example a specific body region of the patient that is to be mapped via the result image data set. In this case, the image data sets contain information on the X-ray attenuation distribution of the patient only with respect to the partial region to be mapped, for example with respect to the thorax or the pelvis. Alternatively, the image data sets relate to the entire body of the patient. In this case, the image data sets contain information on the X-ray attenuation distribution of the patient with respect to the entire body of the patient.

An X-ray quantum energy distribution refers to the energy spectrum of the X-rays used to record one of the image data sets. According to one alternative, the at least two image data sets can be generated with X-rays having X-ray quantum energy distributions that differ from one another. The X-ray quantum energy distributions can, for example, differ in their average X-ray quantum energy or in their peak energy, they can partially overlap spectrally or be completely separated, i.e., have no intersection.

The at least two image data sets which are generated with X-ray quantum energy distributions that differ from one another can be generated with a dual or multi-energy imaging device. Herein, the different X-ray quantum energy distributions are generated by different acceleration voltages at the corresponding X-ray source(s) used in the X-ray recording apparatus. Alternatively, the different X-ray quantum energy distributions can be generated with different spectral filters behind the X-ray source and/or energy-selective detectors can be used. Herein, energy-selective should be understood as meaning spectrally resolving or spectrally separating. Energy-selective detectors are configured to classify incident X-ray quanta according to their quantum energy. An energy-selective X-ray detector can in particular be embodied as a photon-counting direct-converting X-ray detector.

The X-ray quantum energy distributions used to record the image data sets can in particular be prespecified or fixed in advance by the imaging device used and its one or more acceleration voltages or other system parameters, for example parameters of an energy-selective X-ray detector.

This includes the fact that these parameters are also adjusted based on patient information for the patient to be mapped (for example, based on a topogram, or by querying patient information stored in a database or the like) directly before recording.

It is known that different materials or tissue types, for example water or bone or added contrast media, interact with X-rays to different degrees. Moreover, the energy distribution of the X-ray attenuation as it passes through matter is known. This means that low-energy X-rays are absorbed more strongly by matter than higher-energy X-rays. If the first and the second image data set are generated with X-ray quantum energy distributions that differ from one another, the first image data set represents the spatial X-ray attenuation distribution of the patient for the first X-ray energy spectrum, i.e., X-ray quantum energy distribution, and the at least one second image data set represents the X-ray attenuation distribution of the patient for the at least one second X-ray energy spectrum.

If the step of capturing comprises capturing a first image data set of the patient, wherein the first image data set is recorded with contrast medium administration and represents a first X-ray attenuation distribution of the patient with contrast medium, and a second image data set of the patient, wherein the second image data set is recorded without contrast medium administration and represents a first X-ray attenuation distribution of the patient without contrast medium, two time-delayed imaging applications are performed on the patient, wherein, in a first application, a contrast medium is administered and an associated image data set is determined, and wherein, in a second application, no contrast medium is administered and accordingly an associated image data set is determined again. However, herein, the parameters of the imaging application remain the same apart from the administration of contrast medium. In particular, the same X-ray quantum energy distribution is used for both the generation of the first image data set and for the generation of the second image data set. Thus, the first image data set is contrast-enhanced, but the second is not. Herein, in advantageous embodiments, contrast-enhanced image data sets are generated that are as similar as possible, apart from the administration of contrast medium, and which are as identical as possible in parameters of the imaging device, in the mapped patient area and in the condition of the patient. Herein, the first image data set can be determined at a time before or after the second image data set. The image data set without contrast medium administration is frequently generated at a time before the image data set with contrast medium administration.

Prior to the step of determining described below, the first image data set can be registered to the second image data set. This can in particular lead to advantageously improved results if the first and the second image data set do not represent exactly the same time and the same location and a movement of the recorded object at the time of the recording of the first and second image data set cannot be excluded. This can in particular, for example, be the case when two time-delayed imaging applications are performed on the patient, wherein, in a first application, a contrast medium is administered and an associated image data set is determined, and wherein, in a second time-delayed application, no contrast medium is administered and accordingly an associated image data set is determined again. However, it can also be advantageous for the first image data set and the second image data set to be recorded via a so-called dual-energy method using two X-ray spectra. This can particularly advantageously be excluded by using an energy-selective, i.e., energy-resolving, X-ray detector, which is embodied to record the data for the first and second image data set in a first energy range, i.e., corresponding to a first X-ray quantum energy distribution, and a second energy range, i.e., corresponding to a second X-ray quantum energy distribution, simultaneously.

Here, registration should be understood to mean methods with which a unique topographical relationship or correlation is established between the image elements (pixels or voxels) of two images that reproduce the same or a similar object. Correlation is usually determined from distinctive features, so-called landmarks, which are either determined interactively by a user or automatically by a system. Herein, the landmarks can be one-dimensional structures, such as, for example, specific anatomical points, or multi-dimensional structures, such as, for example, surfaces of specific organs that have been previously segmented in the images. However, registration can also take place via intensity value distributions stored in the images. Image registration is a common task in medical image processing for which there are numerous proposed solutions. Examples of usable optimization methods for registration methods are gradient descent methods, downhill simplex methods, hillclimb methods and simulated annealing. It is in particular possible to use non-rigid, flexible or elastic registration for registration. An elastic registration method should be understood to be an image registration method in which elastic transformations, also called "non-rigid transformations", such as spline-based or polynomial-based transformations, can be applied.

The step of determining comprises determining a contrast-enhanced image data set and a non-contrast image data set via a computing unit based on the first and the at least one second image data set.

In the alternative in which the step of capturing comprises capturing a first image data set of the patient, wherein the first image data set is recorded with contrast medium administration and represents a first X-ray attenuation distribution of the patient with contrast medium, and a second image data set of the patient, wherein the second image data set is recorded without contrast medium administration and represents a first X-ray attenuation distribution of the patient without contrast medium, the contrast data set can be determined by subtracting the second image data set from the first image data set, optionally after registration, in particular in the image area. The result of the subtraction then corresponds to the contrast data set. The non-contrast image data set can be determined directly based on the second image data set without contrast medium administration, i.e., in particular correspond directly thereto. The necessary time interval between the two scans results in limitations and it may only be possible to make a qualitative rather than a quantitative statement based on a perfusion image data set generated with this alternative, however this, for example, represents an advantageously feasible option if no suitable imaging system is available for spectral generation of the image data sets, i.e., using different X-ray quantum energy distributions.

In the alternative in which the step of capturing comprises capturing a first image data set representing a first X-ray attenuation distribution of the patient corresponding to a first X-ray quantum energy distribution and at least one second image data set representing at least one second X-ray attenuation distribution of the patient corresponding to at least one second X-ray quantum energy distribution via a first interface, wherein the first and second image data set are recorded with contrast medium administration, the determination of a contrast-enhanced image data set and a non-contrast image data set can be performed as described below.

In the step of determining, it is possible for material or base material decomposition that is known per se to be performed based on the at least two image data sets in at least two (base) materials. The material decomposition is based on the consideration that an X-ray attenuation value measured via an X-ray recording apparatus can be described as a linear combination of X-ray attenuation values of so-called base materials with respect to said X-ray quantum energy distribution. Measured X-ray attenuation values result from the at least two image data sets for different X-ray quantum energy distributions. The material or base material can be any substance or any tissue, in particular water, contrast media such as iodine, soft tissue, bone and the like. The X-ray attenuation of a base material as a function of the energy of X-rays is known in principle or can be ascertained by previous measurements on phantoms and stored in tabular form for retrieval in the course of material decomposition. The result of the material decomposition can be a spatial density distribution of the at least two materials in the patient from which the base material proportions or the base material combination can be determined for each image element in the patient's body region to be mapped. Reference is made, for example, to W. Kalender et. Al "Material selective imaging and density measurement using the two-spectra method, I. Fundamentals and methodology, W. Kalender, W. Bautz, D. Felsenberg, C. Süss and E. Klotz, Digit. Image diagn. 7, 1987, 66-77, Georg Thieme Verlag", which describes a method for base material decomposition with X-ray imaging. Base material decomposition can be carried out in a manner that is obvious to the person skilled in the art both in the image area and in the projection area. Both procedures are equivalent with regard to the method according to one or more example embodiments of the present invention, however the calculation steps are advantageously simple to perform in the image area, since here a calculation can take place image element by image element. Decomposition into more than two materials can in particular be based on more than two captured image data sets, wherein an X-ray quantum energy distribution can be assigned to each image data set, wherein these X-ray quantum energy spectra differ from one another. An example of an approach for multi-material decomposition based on only two image data sets in more than two materials can, for example, be found in US 2010/0 135 453 A1 or in US 2007/0 217 570 A1.

In the context of the method according to one or more example embodiments of the present invention, in addition to the contrast medium as the base material, the base material decomposition can be based on water or a tissue material, in particular a soft tissue material, for example fat, as a second base material. This can, for example, comprise material decomposition into more than two base materials, for example the contrast medium used, water and fat. The second base material or the further base materials can in particular depend on the examination area mapped and the structure to be mapped via the perfusion image data set.

The contrast-enhanced image data set can substantially correspond to a proportion of the X-ray attenuation caused by the contrast medium in the patient. The contrast-enhanced image data set can in particular map the local contrast medium concentration (amount of contrast medium per volume) in the patient. In particular, the contrast-enhanced image data set can result directly from the base material decomposition, wherein a base material represents the contrast medium used. The contrast data set can correspond to the conventional representation of the perfusion of a tissue, for example in the sense of the lung PBV approach.

Furthermore, a (virtual) non-contrast image data set (also called VNC image) is determined on the base material decomposition. The (virtual) non-contrast image data set can in particular map the morphological properties of the tissue of interest.

In the context of the method, in the simplest approximation, the (virtual) non-contrast image data set according to one or more example embodiments of the present invention can correspond to the base material image representing the second base material, which is provided as a result of the base material decomposition into two base materials, for example contrast medium and water or contrast medium and a tissue material, for example fat. This can in particular provide good results if substantially only the two materials are relevant in the represented area of interest, and/or for example water corresponds to a sufficiently accurate approximation for a tissue to be represented. If the perfusion image data set is used to map the perfusion of the lung parenchyma, the water image data set resulting from base material decomposition into contrast medium and water can, for example, correspond to a sufficiently good choice as a (virtual) non-contrast image data set and an advantageously simple implementation.

However, the results of the base material decomposition can also be used as the basis for determining a (virtual) non-contrast image data set that differs from the above-described single material image data set and takes account of combinations of materials present in the relevant area of the patient. A generally known approach for calculating (virtual) non-contrast images can be used for this purpose. For example, reference is made here to Uhrig M et al: Monitoring targeted therapy using dual-energy CT: semi-automatic RECIST plus supplementary functional information by quantifying iodine uptake of melanoma metastases (in Cancer Imaging. 2013 Jul. 22; 13(3):306-13. Doi: 10.1102/1470-7330.2013.0031. PMID: 23876444; PMCID: PMC3719051) and Martin Petersilka et al: Technical principles of dual source CT (in European Journal of Radiology, Volume 68, Issue 3, 2008, Pages 362-368, https://doi.org/10.1016/j.ejrad.2008.08.013).

The step of calculating comprises calculating the perfusion image data set based on a ratio of image values of the contrast-enhanced image data set and locally corresponding image values of the non-contrast image data set via the computing unit.

In a particularly simple and time-efficient embodiment, the final perfusion image data set corresponds directly to the quotient of the contrast-enhanced image data set and the non-contrast image data set or the respective locally corresponding image values. However, this information can depend on acquisition and reconstruction parameters. However, unless a quantitative comparison of differently generated image data sets is to be ensured, implementation of this can be advantageously simple and time-efficient. In further embodiments, the calculation can also comprise further calculation steps or the application of factors to the ratio, for example in order to achieve improved comparability when recorded differently generated image data sets and improved quantifiability.

The step of providing comprises providing the perfusion image data set via a second interface.

The perfusion image data set can be provided for representation on a representation unit, for example a monitor, or for further processing. In particular, in addition to the perfusion image data set, the first or second image data set, the contrast-enhanced image data set and/or the non-contrast image data set can be provided via the interface. In this way, it is, for example, possible to represent the different data sets next to one another or also as selectable one after the other for the comprehensive provision of different information.

The method according to one or more example embodiments of the present invention advantageously combines morphological and functional information and thus makes it possible to take account of dependencies of the perfusion image data on morphological conditions (in particular, for example, disease-related changes). One or more example embodiments of the present invention described here with the linkage of both types of information potentially enables such influences to be compensated.

A particularly advantageous application of the method according to one or more example embodiments of the present invention is the representation of perfusion of the lung parenchyma via the perfusion image data set according to one or more example embodiments of the present invention.

In contrast to other human tissue such as muscle or fat, the density of the lung parenchyma changes by the second. On inhalation, the air-tissue ratio shifts and density decreases. On exhalation, the opposite is the case, and density increases again. This physiological effect can, for example, also be read directly in the measured CT values of inspiratory and expiratory CT images (different HU values). In addition, the density distribution is not homogenous even within a point of time. The typical supine position during imaging and the physical gravity acting on the lung parenchyma result in an inhomogeneous distribution within the lung: the density of the lung parenchyma is highest at the back and decreases steadily toward the sternum.

In a representation of the blood flow in the lung parenchyma in the conventional sense solely via the contrast data set, perfusion is not measured directly, but only a surrogate via the amount of iodine absorbed. In the previous approach in conventional lung PBV solely via the contrast data set, the iodine map shows how much "iodine per volume" (for example, mg/ml) has accumulated in the tissue and ignores the density or amount of the lung parenchyma. Thus, although it is known where more iodine has accumulated and where less, except for cases with large differences, it is not known whether the perfusion of the lung parenchyma is locally lower or higher. This can be sufficient for the representation of large differences in perfusion, but it is not sufficient for a quantitative comparison or the comparison of small differences. For example, the conventional lung PBV value shows different contrast medium concentrations within a slice due to the force of gravity alone, although the perfusion of the tissue of a healthy lung is the same everywhere. Therefore, the previous representation of perfusion based on the contrast map does not always provide information as to whether a higher contrast medium concentration is due to more parenchyma (higher density) or lower perfusion. Quantification is also problematic. The high perfusion differences in a pulmonary embolism are generally detected regardless of this, but other possible applications are limited thereby (for example, the evaluation of perfusion results in the presence of other disease-related changes in the lung; the evaluation of incremental or partial influences; quantification). The method according to one or more example embodiments of the present invention and the perfusion data set resulting therefrom enable a particularly accurate representation taking account of morphology, wherein potentially influencing conditions can be compensated and extend the evaluation and diagnostic possibilities based on this.

The variants of the method according to one or more example embodiments of the present invention described below are in particular based on the alternative according to one or more example embodiments of the present invention in which the step of capturing comprises capturing a first image data set representing a first X-ray attenuation distribution of the patient corresponding to a first X-ray quantum energy distribution and at least one second image data set representing at least one second X-ray attenuation distribution of the patient corresponding to at least one second X-ray quantum energy distribution, wherein the first and second image data set are recorded with contrast medium administration, and furthermore in which the determination comprises base material decomposition based on the first and the at least one second image data set.

For example, in corresponding variants thereof, during the calculation, the ratio of the image values of the contrast-enhanced image data set and the non-contrast image data set can be scaled by a scaling factor, wherein the scaling factor can in particular be dependent on an X-ray photon energy. Suitable scaling can advantageously be used to generate a perfusion image data set in which dependencies on recording parameters are reduced or another improved representation for the extraction of relevant information for an evaluation is enabled. In particular, a suitable choice of scaling enables improved data set standardization and quantification in order to eliminate differences in acquisition parameters.

Herein, the scaling factor can in particular be dependent on at least one of the specific attenuation coefficients $\mu/\rho$ for the base materials on which the base material decomposition is based with the energy-dependent absorption coefficient of the respective base material $\mu$ for X-rays and the respective density $\rho$. If the base materials are, for example, the contrast medium used, in particular iodine, and water or a tissue, in particular a soft tissue, the scaling factor can be dependent on the specific attenuation coefficient for the contrast medium used $$\left(\frac{\mu}{\rho}\right)_I$$

and/or the specific attenuation coefficient for water or the tissue $$\left(\frac{\mu}{\rho}\right)_W.$$

In particular, the scaling factor can comprise a quotient of the specific attenuation coefficients $\mu/\rho$ of the at least two base materials. Such a scaling factor can, for example, be used to generate a virtual monoenergetic perfusion image data set for a defined X-ray photon energy.

The scaling coefficient at different X-ray photon energies can, for example, be held in a retrievable tabular form or provided based on a functional relationship. For example, the functional relationship can be based on a fit to known reference data for the respective base materials.

One or more example embodiments of the present invention furthermore relate to an apparatus for providing a perfusion image data set of a patient comprising a first interface embodied
to capture a first image data set representing a first X-ray attenuation distribution of the patient corresponding to a first X-ray quantum energy distribution and at least one second image data set representing at least one second X-ray attenuation distribution of the patient corresponding to at least one second X-ray quantum energy distribution, wherein the first and second image data set are recorded with contrast medium administration, or
to capture a first image data set of the patient, wherein the first image data set is recorded with contrast medium administration and represents a first X-ray attenuation distribution (also referred to as a third X-ray attenuation distribution) of the patient with contrast medium, and a second image data set of the patient, wherein the second image data set is recorded without contrast medium administration and represents a first X-ray attenuation distribution (also referred to as a fourth X-ray attenuation distribution) of the patient without contrast medium,
a computing unit embodied to determine a contrast-enhanced image data set and a non-contrast image data set based on the first and the at least one second image data set, and to calculate the perfusion image data set based on a ratio of image values of the contrast-enhanced image data set and locally corresponding image values of the non-contrast image data set, and
a second interface embodied to provide the perfusion image data set.

Such an apparatus for providing a perfusion image data set can in particular be embodied to execute the above-described method, according to one or more example embodiments of the present invention, for providing a perfusion image data set and the aspects thereof. The apparatus can be embodied to execute the method and the aspects thereof in that the interfaces and the computing unit are embodied to execute the corresponding method steps.

The apparatus or the computing unit can in particular be a computer, a microcontroller or an integrated circuit. Alternatively, herein, this may enable a real or virtual group of computers (a technical term for a real group is "cluster", a technical term for a virtual group is "cloud"). The apparatus can also be embodied as a virtual system that is executed on a real computer or a real or virtual group of computers (virtualization).

An interface can be a hardware or software interface (for example, PCI bus, USB or Firewire). A computing unit can have hardware elements or software elements, for example a microprocessor or a so-called FPGA ("field-programmable gate array").

The interfaces can in particular comprise a plurality of subinterfaces. In other words, the interfaces can also comprise a plurality of interfaces. The computing unit can in particular comprise a plurality of subcomputing units that execute different steps of the respective methods. In other words, the computing unit can also be understood to be a plurality of computing units.

The apparatus can also comprise a memory unit. A memory unit may be realized as a non-permanent random-access memory (RAM) or a permanent mass storage device (hard disk, USB stick, SD card, solid state disk).

The advantages of the proposed apparatus substantially correspond to the advantages of the proposed method for generating a result image data set. Features, advantages or alternative embodiments mentioned herein can likewise also be transferred to the apparatus and vice versa.

Furthermore, one or more example embodiments of the present invention relate to a medical imaging device comprising an apparatus for providing a perfusion image data set as described above and comprising at least one X-ray source opposite at least one X-ray detector, wherein a patient can be arranged between the X-ray source and the X-ray detector. The medical imaging device can be embodied to generate first and second image data sets accordingly.

The advantages of the proposed medical imaging device substantially correspond to the advantages of the proposed method for providing a perfusion image data set. Features, advantages or alternative embodiments can likewise also be transferred to the imaging device and vice versa.

The medical imaging device can be embodied to provide a first image data set representing a first X-ray attenuation distribution of the patient corresponding to a first X-ray quantum energy distribution and at least one second image data set representing at least one second X-ray attenuation distribution of the patient corresponding to at least one second X-ray quantum energy distribution, wherein the first and second image data set are recorded with contrast medium administration.

The imaging device can in particular be an X-ray device, configured to record a plurality of X-ray projections from different projection angles, for example a computed tomography device with an annular rotating frame or a C-arm X-ray device. The images can be generated during an, in particular continuous rotational movement of a recording unit comprising the X-ray source and the X-ray detector interacting with the X-ray source. An X-ray source can in particular be an X-ray tube with a rotary anode. An X-ray detector for a computed tomography device is, for example, a line detector with a plurality of lines. An X-ray detector for a C-arm-X-ray device is, for example, a flat-panel detector.

The X-ray detector can correspond to a spectrally separating X-ray detector. This is configured to classify incident X-ray quanta corresponding to their quantum energy and to assign them to one of the image data sets in each case. In this way, only one X-ray source with a prespecified or fixed emission spectrum is required for the method according to one or more example embodiments of the present invention. According to this aspect, the image data sets are recorded particularly quickly and without additional dose exposure for the patient. The X-ray detector can be a quantum-counting detector or a two-layer detector. A quantum-counting detector should typically be understood to be a direct-conversion detector that converts an incident X-ray quantum directly into an electrical signal via suitable detector material. Quantum-counting detectors can be operated in an energy-resolving manner, wherein the energy resolution can be set via so-called binning. In other words, it is possible to define any energy ranges with respect to which incident X-ray quanta can be classified. The first and the at least one second image data set are in each case formed by signals within one or more energy ranges. The assignment of energy ranges to the image data sets can take place in dependence on the first and/or at least one second X-ray quantum energy distribution. Suitable detector materials for quantum-counting detectors are the semiconductors cadmium telluride, cadmium zinc telluride or gallium arsenide or, in the case of a flat-panel detector, amorphous selenium or the like. A two-layer detector, or dual or double-layer detector is embodied to split the incident X-ray tube spectrum into a low-energy and a high-energy component. For this purpose, the two-layer detector consists of two slices. A detector layer facing the X-ray source measures photons of the incident X-rays with low energy and allocates the measured signals to the first image data set. It is penetrated by high-energy X-rays. Photons with a higher quantum energy are measured in the detector layer arranged below or behind, i.e., facing away from, the X-ray source and assigned to the second image data set. Typically, both detector layers comprise a scintillator, consequently the two-layer detector is an indirect-conversion detector. The scintillation material used is crystals such as cesium iodide, cadmium tungstate or ceramic materials, such as, for example, gadolinium oxysulfide or the like.

The imaging device can also comprise two source-detector systems operating at different emission-spectra. In this case, the imaging device comprises two X-ray sources and two X-ray detectors, wherein each detector is configured to record the X-rays emitted by one of the X-ray sources. This is also referred to as a dual-source X-ray imaging apparatus. At least one of the two X-ray sources can also comprise a filter for improving the spectral separation of the outgoing X-rays, in particular a tin filter.

The imaging device can also be embodied for so-called "kV switching", wherein the X-ray source emits different emission spectra in rapid succession in the direction of an X-ray detector.

The imaging device can also be embodied as a so-called "twin-beam" device, wherein a source-detector system is provided, and a filter made of two materials is positioned in front of the X-ray source so that, after passage through the filter, two X-ray quantum energy distributions are present that are different from one another and each illuminate a partial area of the X-ray detector.

Furthermore, one or more example embodiments of the present invention relate to a computer program product with a computer program, which can be loaded directly into a memory of an apparatus for providing a perfusion image data set as described above, with program sections for executing all the steps of one of the above-described methods for providing a perfusion image data set, or the aspects thereof, when the program sections are executed by the apparatus.

Furthermore, one or more example embodiments of the present invention relate to a computer-readable storage medium on which program sections which can be read and executed by an apparatus for providing a perfusion image data set as claimed in claim 8 are stored for executing all the steps of one of the above-described methods for providing a perfusion image data set, or the aspects thereof, when the program sections are executed by the apparatus.

Examples of a computer-readable storage medium are a DVD, a magnetic tape, a hard disk or a USB stick on which electronically readable control information, in particular software, is stored.

An extensively software-based implementation has the advantage that it is also possible to retrofit apparatuses and computing units used to date in a simple way by a software update in order to work in the manner according to one or more example embodiments of the present invention. In addition to the computer program, a computer program product can optionally comprise additional parts such as, for example, documentation and/or additional components, and hardware components, such as, for example, hardware keys (dongles etc.) for using the software, In the context of the present invention, it is also possible for features described in relation to different embodiments of the present invention and/or different claim categories (method, use, apparatus, system, arrangement, etc.) to be combined to form further embodiments of the present invention. For example, a claim relating to an apparatus can also be developed with features described or claimed in connection with a method and vice versa. Herein, functional features of a method can be executed by correspondingly embodied concrete components.

The use of the indefinite article "a" or "an" does not preclude the feature in question from also being present more than once. The use of the expression "has/have" does not preclude the terms being linked by the term "has/have" from being identical. For example, the medical imaging apparatus has the medical imaging apparatus. The use of the expression "unit" does not preclude the subject matter to which the expression "unit" refers from having a plurality of components that are spatially separated from one another.

In the context of the present application, the expression "based on" can in particular be understood in the sense of the expression "using". In particular, wording according to which a first feature is generated (alternatively: determined, ascertained, etc.) based on a second feature does not preclude the first feature from being generated (alternatively: determined, ascertained, etc.) based on a third feature.

BRIEF DESCRIPTION OF THE DRAWINGS

The following explains exemplary embodiments with reference to the attached figures. The representation in the figures is schematic, greatly simplified and not necessarily true to scale. The figures show:

FIG. 1 a schematic view of different scenarios of the perfusion of lung tissue,

FIG. 2 a schematic depiction of the course of a method for providing a perfusion image data set, FIG. 3 a schematic representation of an apparatus for providing a perfusion image data set, and FIG. 4 a schematic representation of an exemplary medical imaging device.

DETAILED DESCRIPTION

Figure 4:
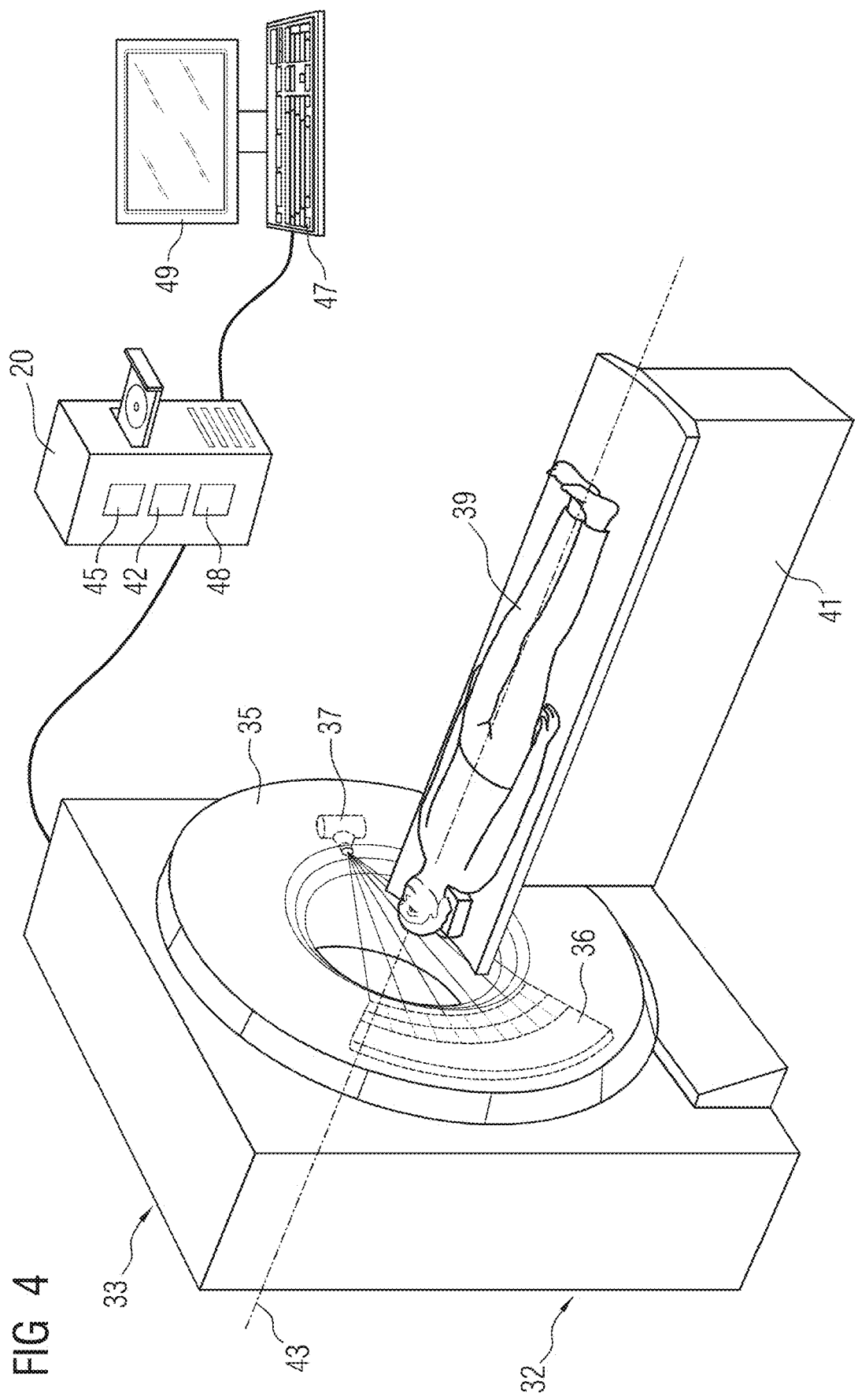

FIG. 1 is a schematic view of different scenarios of the perfusion of lung tissue in order to represent the deficits of a conventional evaluation of the perfusion of the lung parenchyma based on the conventional lung PBV value. In the previous conventional lung PBV approach, the contrast map resulting from base material decomposition shows how much "contrast medium per volume" (for example, mg/ml) has accumulated in the tissue and ignores the density, or amount, of the lung parenchyma. Thus, although it is known where more iodine has accumulated and where less, except for cases with large differences, it is not known whether the perfusion of the lung parenchyma is locally lower or higher.

The first row represents a lung volume LV with vessels a that are normally perfused at the microscopic level. Mapping via the conventional PBV value produces a first lung PBV value PBV1 with a first perfusion level at the macroscopic level.

The second row represents a lung volume LV with vessels a that are normally perfused at the microscopic level, but, for example, in a state of exhalation, while the first row reflects a state of inhalation so that, with mapping via the conventional lung PBV value, a higher number of normally perfused vessels per volume unit leads to a second lung PVB value PBV2 having a second perfusion level, which is higher than the first, at the macroscopic level, although there is normal perfusion of the vascular structure. Therefore, the previous determination of lung perfusion based solely on contrast medium concentration per volume does not always provide information as to whether a higher concentration of contrast medium is attributable to more parenchyma (higher density) or to lower perfusion. Quantification is also problematic.

The third row shows a lung volume LV for example, in a state of inhalation, which, due to inflammation, for example as the result of a viral infection, has increased perfused vascular structures b. Here, mapping via the conventional lung PBV value could lead to the same, or at least similar, lung PBV2 value as with normally perfused tissue in a state of exhalation (second row), i.e., two different scenarios with different perfusion levels at the microscopic level can lead to the same perfusion level at the macroscopic level based on the conventional lung PBV value. No differentiation between the states is possible on this basis.

In addition, as represented in the fourth row, there may also be depositions c, for example of fluids, which can additionally change the composition of the lung tissue. In this case, once again, mapping via the conventional lung PBV value could lead to the same, or at least similar, PBV2 value as for normally perfused tissue in a state of exhalation (second row). Here, once again, differentiation would not be possible.

In such cases, the previously used division of the results of an examination of the perfusion of the lung parenchyma into a purely functional part (contrast-enhanced image) has its limitations. Embodiments of the present invention described here with the linkage of both types of information potentially enables the compensation of such influences and the provision of distinguishable or potentially quantifiable results.

FIG. 2 is a schematic depiction of the course of the method according to one or more example embodiments of the present invention for providing a perfusion image data set.

In a first alternative of the schematic course of the method, the step S1 comprises capturing a first image data set of the patient 39, wherein the first image data set is recorded with contrast medium administration and represents a first X-ray attenuation distribution (also referred to as a third X-ray attenuation distribution) of the patient 39 with contrast medium, and a second image data set of the patient 39, wherein the second image data set is recorded without contrast medium administration and represents a first X-ray attenuation distribution (also referred to as a fourth X-ray attenuation distribution) of the patient 39 without contrast medium.

In a second alternative of the course of the method, the step S1 comprises capturing a first image data set representing a first X-ray attenuation distribution of the patient 39 corresponding to a first X-ray quantum energy distribution and at least one second image data set representing at least one second X-ray attenuation distribution of the patient 39 corresponding to at least one second X-ray quantum energy distribution via a first interface IF1, wherein the first and second image data set are recorded with contrast medium administration.

The step S2 comprises determining a contrast-enhanced image data set and a non-contrast image data set via a computing unit CU.

In the first alternative, the contrast data set can be determined by subtracting the second image data set from the first image data set, optionally after registering the image data sets to one another, in the image area. The result of the subtraction then corresponds to the contrast data set. The non-contrast image data set can be determined directly based on the first image data set without contrast medium administration, i.e., it can in particular correspond directly thereto.

In the second alternative, the determination of a contrast-enhanced image data set and a non-contrast image data set via a computing unit CU can in particular comprise base material decomposition based on the first and the at least one second image data set. In one embodiment, the base material decomposition is based on at least the base materials comprising the contrast medium used and water or the contrast medium used and a tissue material, in particular a soft tissue material. In other embodiments, it is also possible to differentiate between more than two base materials, for example the contrast medium, water and fat. The contrast data set can substantially result directly from the base material decomposition and maps the local contrast medium concentration (amount of contrast medium per volume) in the patient. In simple embodiments, the non-contrast image can correspond directly to the base material image set resulting from the base material decomposition, which, in the case of base material decomposition into contrast medium and a second material, is assigned to the second material. For example, the non-contrast image can correspond to a water image data set. This is in particular advantageous if the region of interest relating to the material composition can be sufficiently well described in terms of its morphology based on the second material. In other variants, the non-contrast image data set can also be provided otherwise, so that different materials in the relevant image region are taken into account. In particular, a generally known approach for calculating virtual non-contrast images (so-called VNC images) can be used here. However, if the perfusion image data set is, for example, used to map the perfusion of the lung parenchyma in the context of an advantageously simple assumption and implementation, the water image data set resulting from base material decomposition into contrast medium and water can, for example, be selected as the non-contrast image data set in order to obtain a suitable perfusion image data set.

The step S3 comprises calculating S3 the perfusion image data set based on a ratio of image values of the contrast-enhanced image data set and locally corresponding image values of the non-contrast image data set via the computing unit CU.

The step S4 comprises providing S4 the perfusion image data set via a second interface IF2.

In a particularly simple and time-efficient embodiment, the final perfusion image data set corresponds directly to the quotient of the contrast-enhanced image data set and the non-contrast image data set, or the respective locally corresponding image values.

However, in particular in connection with the above-described second alternative, the calculation S3 of the perfusion image data set can moreover also comprise scaling the ratio of the image values of the contrast-enhanced image data set and the non-contrast image data set by a scaling factor. The scaling factor can in particular also be dependent on an X-ray photon energy L. The scaling factor can, for example, be dependent on at least one of the specific attenuation coefficients $$\frac{\mu}{\rho}$$

for the base materials on which the base material decomposition is based with the respective absorption coefficient of the base material μ for X-rays at an energy L at a defined X-ray photon energy and the respective density ρ. In particular, the scaling factor can comprise a quotient of the specific attenuation coefficients $$\frac{\mu}{\rho}$$

of the at least two base materials at a specific X-ray photon energy and serve to generate a virtual monoenergetic perfusion image data set for this X-ray photon energy. Possible implementations of a scaling factor are explained in more detail below.

For example, according to one variant, a perfusion image data set PD for a defined X-ray photon energy L can be calculated as follows:

$$PD(L) = \frac{b_I}{b_w} \cdot hum(L)$$

Here, $b_w$ [in HU] and $b_I$ [in g/cm3] correspond by way of example to the base material image of water or tissue $b_w$ and the base material image of the contrast medium $b_I$, for example iodine, from base material decomposition into these two materials. If the base material decomposition is based on other base materials, corresponding base material images should be used. In particular in the area of the lung, which, as already described, is a particularly advantageous application of the method according to one or more example embodiments of the present invention, the choice of water as the base material can be a suitable approximation and enable simple provision, since the relevant region of the lung, in particular the density of the lung tissue, is thus described sufficiently well and few other materials, such as fat or also calcifications, play a role.

hum(L) corresponds to a scaling factor dependent on an X-ray photon energy L and based on the specific attenuation coefficients of the base materials $$\frac{\mu}{\rho}$$

at an X-ray photon energy L for the base materials on which the base material decomposition is based, for example water and the contrast medium, with the respective energy-dependent absorption coefficient of the base material μ for X-rays and the respective density ρ. Here, the scaling factor in particular comprises a quotient of the specific attenuation coefficients of the two base materials at the energy L:

$$hum(L) \propto \frac{\left(\frac{\mu}{\rho}\right)_I(L)}{\left(\frac{\mu}{\rho}\right)_W(L)}$$

Specifically, the scaling factor can, for example, be defined as follows:

$$hum(L) = \frac{\left(\frac{\mu}{\rho}\right)_I(L)}{\left(\frac{\mu}{\rho}\right)_W(L)} \cdot 1000 HU$$

The scaling coefficient at different energies L can, for example, be held in a retrievable tabular form or provided based on a functional relationship. For example, the functional relationship can be based on a fit to known reference data for the respective base materials (for example, using the NIST X-ray attenuation database, https://physics.nist.gov/). The application of the scaling factor at a selected X-ray photon energy L then enables the perfusion image data set for this X-ray photon energy to be calculated.

To a certain extent, the energy-dependent scaling factor enables a representation of the perfusion image data set in the sense of a virtual monoenergetic perfusion image data set at a defined energy level L in a similar style as the known representation of virtual monoenergetic images VMI(L) at an energy level L. In the case of virtual monoenergetic images VMI, the definition at an energy level, and the thus associated fixed attenuation behaviors of all materials, standardizes the representation in order to eliminate differences in CT-acquisition parameters. This is in particular interesting in the context of the possible standardization of all recordings by new technologies (for example, photon-counting detectors). For the generation of virtual monoenergetic images, reference can be made, for example, to DE 10 2015 204 450 A1.

A virtual monoenergetic image can be calculated in a simplified manner from a linear combination of the base material images determined. For example, a virtual monoenergetic image can be assembled in a simplified manner based on two-material decomposition into the two materials water or tissue and contrast medium, for example iodine as follows:

$$VMI(L) = b_w + b_I \cdot hum(L)$$

wherein, according to the above calculation of the perfusion image data set, $b_w$ [in HU] and $b_I$ [in g/cm3] correspond by way of example to the base material images of water or tissue and contrast medium from base material decomposition. The function hum(L) enables CT values per concentration at the defined energy L to be calculated. If the base material decomposition is based on other base materials, corresponding base material images should be used. If, in the context of an X-ray imaging application with contrast medium administration based on the first and second image data set, virtual monoenergetic image data sets are calculated anyway, the intermediate results of the monochromatization, $b_w$ and $b_I$, can be used for the calculation of the perfusion data set.

As with the provision of virtual monoenergetic image data sets, an X-ray photon energy to be used for the calculation can be defined for the calculation of the perfusion image data set, or it is also possible for different energies L to be repeatedly selected for which a perfusion image data set is calculated. In particular, a method can also comprise a step of selecting an X-ray photon energy. Here, a user can then, for example, select, for example via an input unit such as a keyboard, an X-ray photon energy for which the perfusion image data set is to be calculated. The selection could also be defined automatically based on other parameters, for example patient-specific parameters, such as a patient's weight or size.

In addition to the aforementioned scaling using hum(L), other types of scaling may also be desirable in the context of the method. For example, scaling with a HU-free background can be useful:

$$PD(L) = \frac{b_I \cdot 1000HU}{b_w \cdot \left(\frac{\mu}{\rho}\right)_W (L)}$$

wherein $b_w$ [in HU] and $b_I$ [in g/cm3] correspond to the base material images of water and contrast medium.

Furthermore, subsequent calculations of a perfusion image data set, according to one or more example embodiments of the present invention, on already created virtual monoenergetic images with two different energy levels ($L_1$ and $L_2$) are also feasible. This is possible because each VMI basically only represents a linear combination of the contrast medium, mapped by $b_I$, and water or the tissue, mapped by $b_w$, and the base materials can be extracted again by the explicit knowledge of the linear factors.

$$PD(L) = \frac{b_I}{b_w} \cdot hum(L) = \frac{(VMI(L_1) - VMI(L_2)) \cdot hum(L)}{(VMI(L_2) \cdot hum(L_1) - VMI(L_1) \cdot hum(L_2))}$$

with the virtual monoenergetic image data set at an energy $L_1$ or $L_2$ (in keV), the scaling factor hum(L) at a selectable energy L for the perfusion image data set PD(L) or the respective energies $L_1$ or $L_2$.

In the above formulas, there would be no explicit mention of the use of pseudo densities [in HU] instead of the actual HU values in the image data sets, which corresponds to the addition of 1000 HU, in order to avoid divisions by zero, in particular when water is used as the base material and is calculated in HU units.

FIG. 3 is a schematic representation of an apparatus 20 for providing a perfusion image data set of a patient 39.

The apparatus 45 comprises a first interface IF1 embodied to capture a first image data set of the patient 39 representing a first X-ray attenuation distribution of the patient 39 corresponding to a first X-ray quantum energy distribution and at least one second image data set of the patient 39 representing at least one second X-ray attenuation distribution of the patient 39 corresponding to at least one second X-ray quantum energy distribution. Alternatively, the first interface IF1 can be embodied to capture a first image data set of the patient 39, wherein the first image data set is recorded with contrast medium administration and represents a first X-ray attenuation distribution (also referred to as a third X-ray attenuation distribution) of the patient 39 with contrast medium, and a second image data set of the patient 39, wherein the second image data set is recorded without contrast medium administration and represents a first X-ray attenuation distribution (also referred to as a fourth X-ray attenuation distribution) of the patient 39 without contrast medium.

Furthermore, the apparatus 45 comprises a computing unit CU embodied to determine a contrast-enhanced image data set and a non-contrast image data set based on the first and the at least one second image data set, and to calculate the perfusion image data set based on a ratio of image values of the contrast-enhanced image data set and locally corresponding image values of the non-contrast image data set.

Furthermore, the apparatus 45 comprises a second interface IF2 embodied to output the perfusion image data set.

Furthermore, the apparatus 45 comprises a memory unit MU. The memory unit MU can be used to hold captured image data sets or a calculated perfusion image data set in a retrievable manner. A memory unit MU can be implemented as a non-permanent random-access memory (RAM) or as a permanent mass storage device (hard disk, USB stick, SD card, solid state disk).

Such an apparatus 45 for providing a perfusion image data set can in particular be embodied to execute the above-described method, according to one or more example embodiments of the present invention, for providing a perfusion image data set and the aspects thereof. The apparatus can be embodied to execute the method and the aspects thereof in that the interfaces If1, If2 and the computing unit CU are embodied to execute the corresponding method steps.

In the exemplary embodiment shown, the apparatus 45 is connected to a medical imaging device 32. The apparatus 45 can, for example, be connected to the imaging device 32 via a network. In particular, the apparatus can also be comprised by the imaging device 32. The imaging device 32 can, for example, be a computed tomography device.

The network can be a local area network (LAN) or a wide-area network (WAN). An example of a local area network is an intranet, an example of a wide-area network is the internet. The network can in particular also be embodied as wireless, in particular as a WLAN (wireless LAN, commonly known as WiFi) or as a Bluetooth connection. The network can also be embodied as a combination of the above examples.

Furthermore, communication between the apparatus 45 and an imaging device 32 can also take place offline, for example by an exchange of data carriers.

FIG. 3 shows a medical imaging device 32 in the form of a computed tomography device.

The CT device has a gantry 33 with a rotor 35. The rotor 35 comprises at least one X-ray source 37, in particular an X-ray tube, and opposite thereto at least one X-ray detector 36. The X-ray detector 36 and the radiation source 37 can be rotated about a common axis 43 (also called the axis of rotation). The patient 39 is supported on a patient support 41 and can be moved through the gantry 33 along the axis of rotation 43. In general, the patient 39 can, for example, be a veterinary patient and/or a human patient.

The CT device 32 comprises a computer system 20 comprising an apparatus 45 for providing a perfusion image data set. The computer system 20 can also comprise a reconstruction unit 42 for reconstructing image data sets based on the data determined by the imaging device 32. The computer system 20 can also have a control unit 48 for actuating the imaging device.

Furthermore, an input facility 47 and an output facility 49 are connected to the computer system 20. The input facility 47 and the output facility 49 can, for example, enable interaction, for example manual configuration, confirmation or triggering of a method step by a user. For example, computed tomography projection data sets and/or a two-dimensional image data set or a three-dimensional image data set can be displayed to the user on the output apparatus 49 comprising a monitor.

Usually, measurement data in the tabular form of a plurality of (raw) projection data sets of the patient 39 are recorded from a plurality of projection angles during a relative rotational movement between the radiation source and the patient, while the patient 39 is moved continuously or sequentially through the gantry 33 via the patient support 41. Subsequently, a slice image data set can be reconstructed for a respective z-position along the axis of rotation within an examination area based on the projection data sets via a mathematical method, for example comprising filtered back projection or an iterative reconstruction method.

The imaging device 32 is in particular embodied to generate at least the first and the second image data set according to one or more example embodiments of the present invention. The apparatus for providing a perfusion image data set comprised by the computer system 45 is then in particular embodied, based on these image data sets, to perform a method according to one or more example embodiments of the present invention for providing a perfusion image data set.

The X-ray detector 36 can correspond to a spectrally separating X-ray detector, for example a quantum-counting detector or a two-layer detector. The imaging device 32 can also be embodied for so-called "kV switching", wherein the X-ray source emits different emission spectra in rapid succession in the direction of an X-ray detector 36. The X-ray device can also be embodied as a so-called "twin-beam" device.

In other embodiments, the imaging device can also comprise two X-ray source-detector systems operating at different emission spectra. In this case, the imaging device comprises two X-ray sources and two X-ray detectors, wherein each detector is configured to record the X-rays emitted by one of the X-ray sources. This is also referred to as a dual-source X-ray imaging apparatus. At least one of the two X-ray sources can also comprise a filter for improving the spectral separation of the emitted X-rays, in particular a tin filter.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules.

Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Although the present invention has been shown and described with respect to certain example embodiments, equivalents and modifications will occur to others skilled in the art upon the reading and understanding of the specification. The present invention includes all such equivalents and modifications and is limited only by the scope of the appended claims.

What is claimed is:

1. A method for providing a perfusion image data set of a patient, the method comprising:
    capturing, via a first interface, a first image data set and at least one second image data set, wherein
        the first image data set represents a first X-ray attenuation distribution of the patient corresponding to a first X-ray quantum energy distribution, the at least one second image data set represents at least one second X-ray attenuation distribution of the patient corresponding to at least one second X-ray quantum energy distribution, and the first image data set and the at least one second image data set are recorded with contrast medium administration, or
        the first image data set is recorded with contrast medium administration and represents a third X-ray attenuation distribution of the patient with contrast medium, and the at least one second image data set is recorded without contrast medium administration and represents a fourth X-ray attenuation distribution of the patient without contrast medium;
    determining, via processing circuitry, a contrast-enhanced image data set and a non-contrast image data set based on the first image data set and the at least one second image data set;
    calculating, via the processing circuitry, the perfusion image data set based on a ratio of image values of the contrast-enhanced image data set and locally corresponding image values of the non-contrast image data set; and
    providing the perfusion image data set via a second interface.

2. The method as claimed in claim 1, wherein the capturing comprises:
    capturing the first image data set representing the first X-ray attenuation distribution of the patient corresponding to the first X-ray quantum energy distribution and the at least one second image data set representing the at least one second X-ray attenuation distribution of the patient corresponding to the at least one second X-ray quantum energy distribution, wherein
        the first image data set and the at least one second image data set are recorded with a contrast medium administered, and
        the determining includes a base material decomposition based on the first image data set and the at least one second image data set.

3. The method as claimed in claim 2, wherein
the base material decomposition is based on at least two base materials including
    the contrast medium, and
    water or a tissue material, and
the non-contrast image data set corresponds to a water image data set or a tissue image data set resulting from the base material decomposition.

4. The method as claimed in claim 3, wherein the calculating comprises:
    scaling, the ratio by a scaling factor.

5. The method as claimed in claim 4, wherein the scaling factor is dependent on an X-ray photon energy.

6. The method as claimed in claim 5, wherein the scaling factor is dependent on at least one of specific attenuation coefficients $\mu/\rho$ for the at least two base materials on which the base material decomposition is based with an energy-dependent absorption coefficient of a respective base material $\mu$ for X-rays and a respective density $\rho$.

7. The method as claimed in claim 3, wherein the perfusion image data set in particular maps perfusion of lung parenchyma.

8. The method as claimed in claim 2, wherein the calculating comprises:
    scaling, the ratio by a scaling factor.

9. The method as claimed in claim 8, wherein the scaling factor is dependent on an X-ray photon energy.

10. The method as claimed in claim 9, wherein the scaling factor is dependent on at least one of specific attenuation coefficients $\mu/\rho$ for the base materials on which the base material decomposition is based with an energy-dependent absorption coefficient of a respective base material $\mu$ for X-rays and a respective density $\rho$.

11. The method as claimed in claim 8, wherein the scaling factor is dependent on at least one of specific attenuation coefficients µ/ρ for base materials on which the base material decomposition is based with an energy-dependent absorption coefficient of a respective base material µ for X-rays and a respective density ρ.

12. The method as claimed in claim 11, wherein the scaling factor includes a quotient of the specific attenuation coefficients µ/ρ for the base materials.

13. The method as claimed in claim 11, wherein the perfusion image data set in particular maps perfusion of lung parenchyma.

14. The method as claimed in claim 8, wherein the perfusion image data set in particular maps perfusion of lung parenchyma.

15. The method as claimed in claim 2, wherein the perfusion image data set in particular maps perfusion of lung parenchyma.

16. The method as claimed in claim 1, wherein the perfusion image data set maps perfusion of lung parenchyma.

17. A non-transitory computer program product including a computer program that, when executed by at least one processor at an apparatus for providing perfusion image data, causes the apparatus to perform the method as claimed in claim 1.

18. A non-transitory computer-readable storage medium storing program sections that, when executed by at least one processor at an apparatus for providing perfusion image data set, causes the apparatus to perform the method as claimed in claim 1.

19. An apparatus for providing a perfusion image data set of a patient, the apparatus comprising:

a first interface configured to capture a first image data set and at least one second image data set, wherein
  the first image data set represents a first X-ray attenuation distribution of the patient corresponding to a first X-ray quantum energy distribution, the at least one second image data set represents at least one second X-ray attenuation distribution of the patient corresponding to at least one second X-ray quantum energy distribution, and the first image data set and the at least one second image data set are recorded with contrast medium administration, or
  the first image data set is recorded with contrast medium administration and represents a third X-ray attenuation distribution of the patient with contrast medium, and the at least one second image data set is recorded without contrast medium administration and represents a fourth X-ray attenuation distribution of the patient without contrast medium;

processing circuitry configured to
  determine a contrast-enhanced image data set and a non-contrast image data set based on the first image data set and the at least one second image data set, and
  calculate the perfusion image data set based on a ratio of image values of the contrast-enhanced image data set and locally corresponding image values of the non-contrast image data set; and a second interface configured to provide the perfusion image data set.

20. A medical imaging device comprising:
the apparatus as claimed in claim 19; and
at least one X-ray source opposite at least one X-ray detector.

* * * * *